Sept. 5, 1944.  E. B. MARPLE  2,357,417
INDICATOR FOR LOCATING MISSING AIRCRAFT
Filed Sept. 13, 1943  5 Sheets-Sheet 1
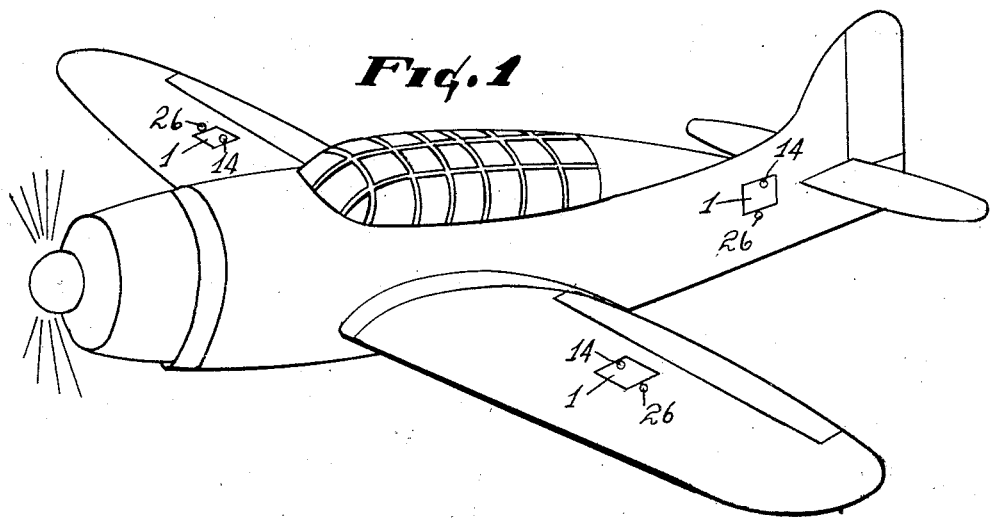
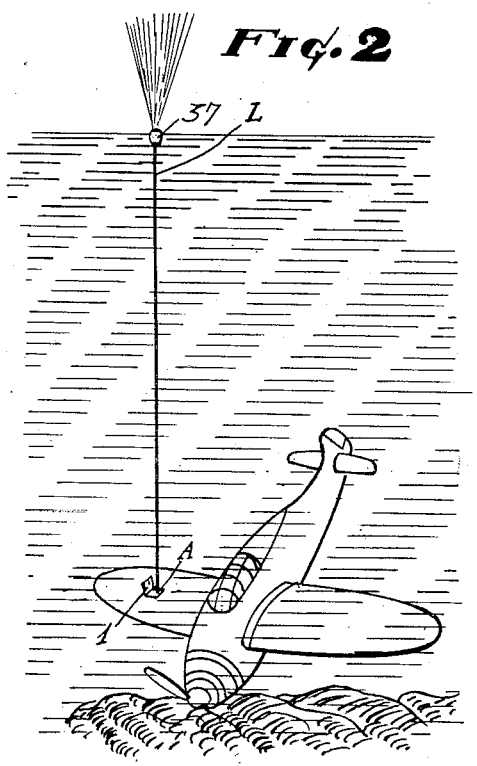
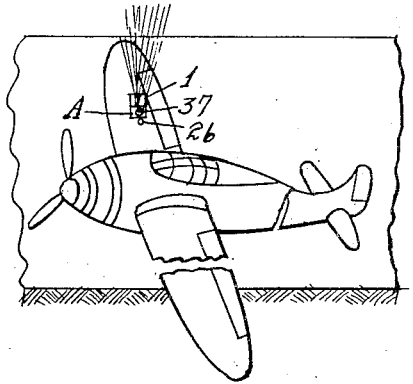
INVENTOR.
ELMORE B. MARPLE

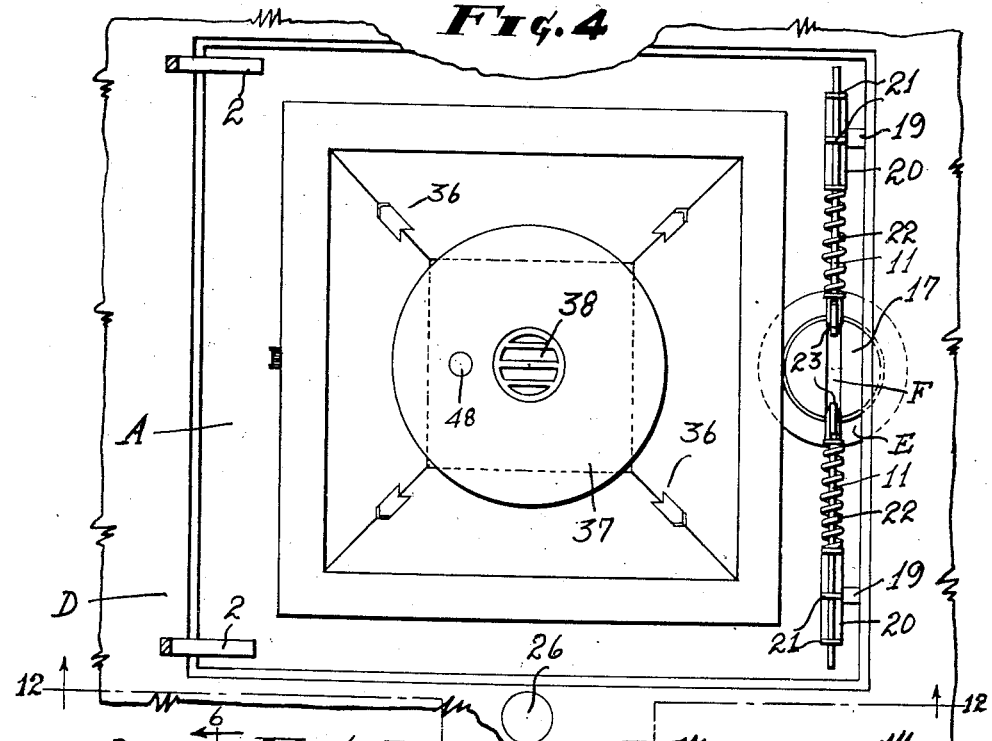
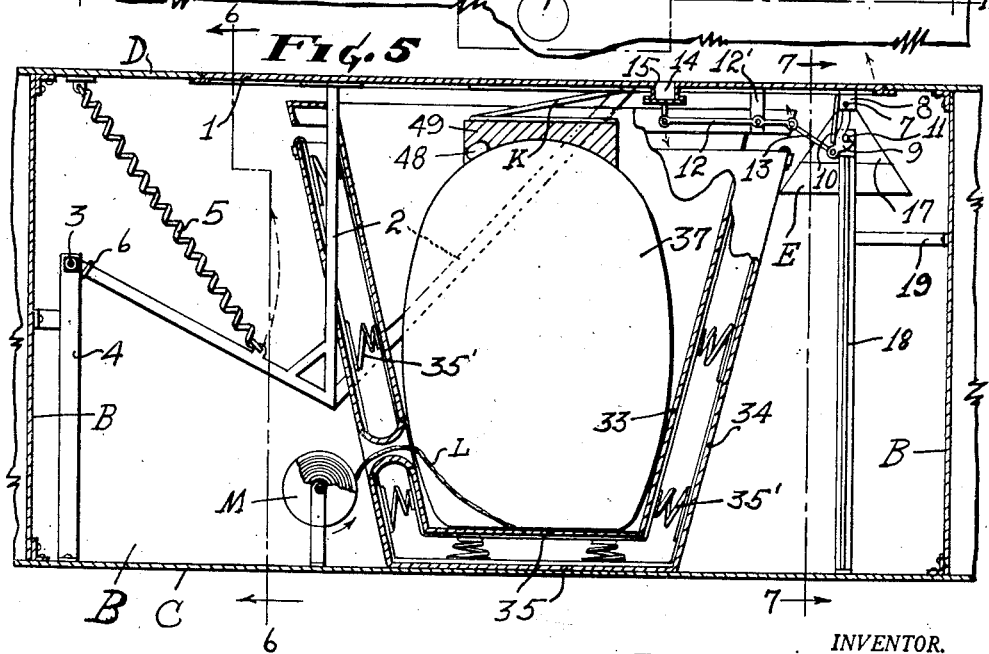

Sept. 5, 1944.   E. B. MARPLE   2,357,417
INDICATOR FOR LOCATING MISSING AIRCRAFT
Filed Sept. 13, 1943   5 Sheets-Sheet 3
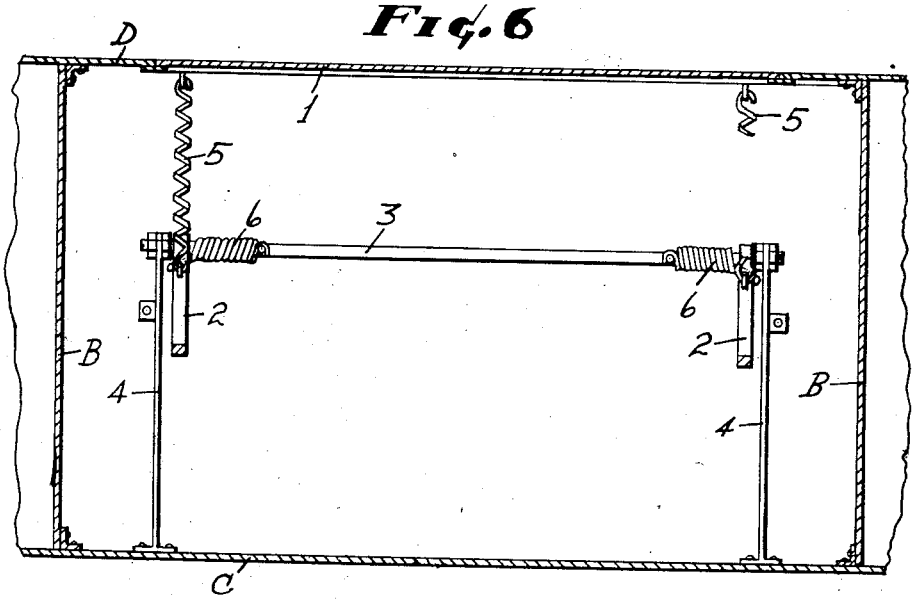
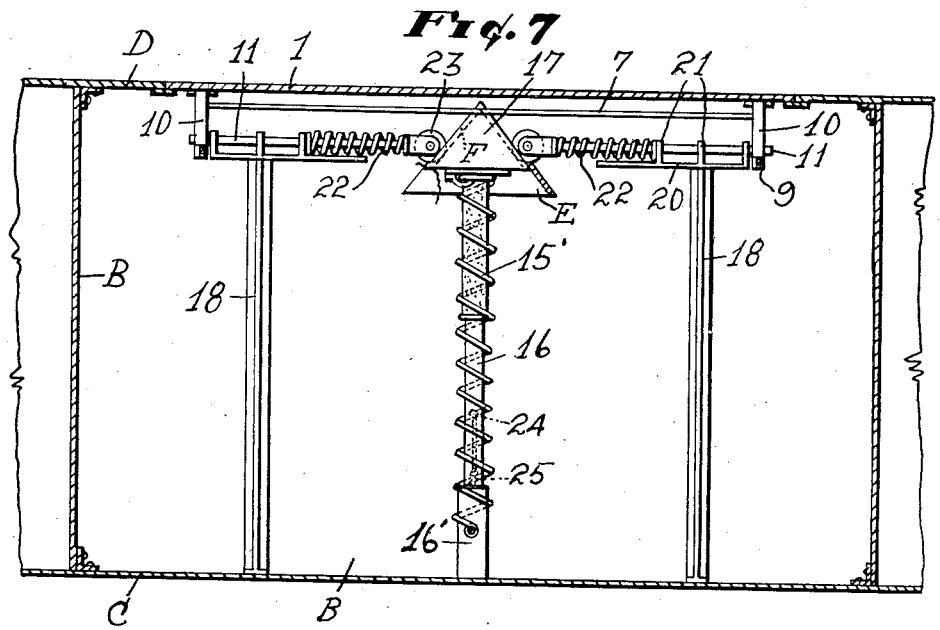
INVENTOR.
ELMORE B. MARPLE.

Sept. 5, 1944.  E. B. MARPLE  2,357,417
INDICATOR FOR LOCATING MISSING AIRCRAFT
Filed Sept. 13, 1943  5 Sheets-Sheet 4
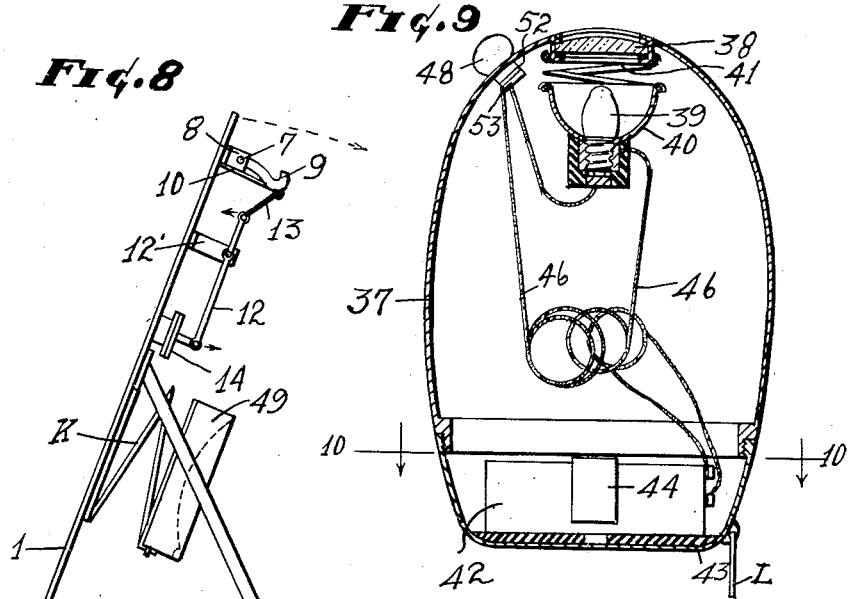
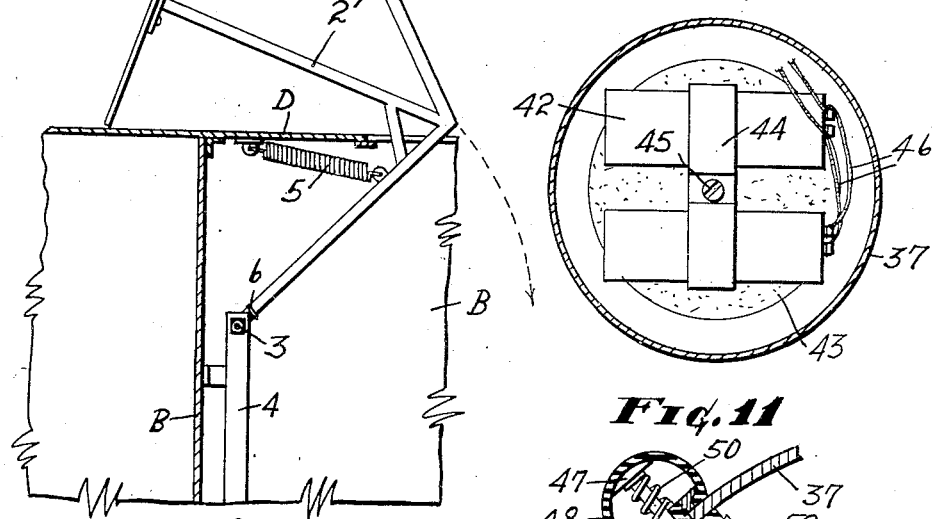
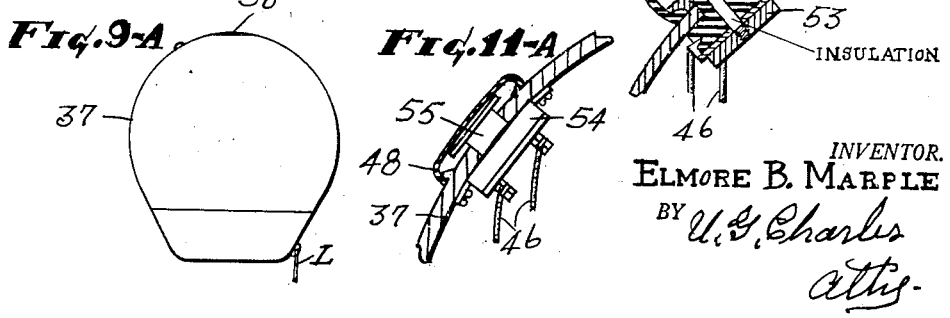
INVENTOR.
ELMORE B. MARPLE Sept. 5, 1944.  E. B. MARPLE  2,357,417
INDICATOR FOR LOCATING MISSING AIRCRAFT
Filed Sept. 13, 1943   5 Sheets-Sheet 5
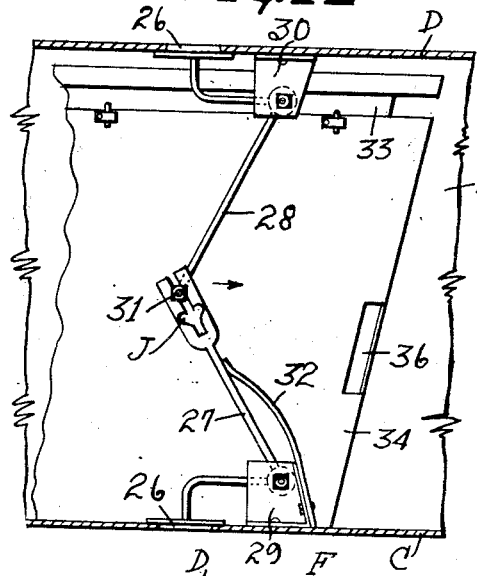
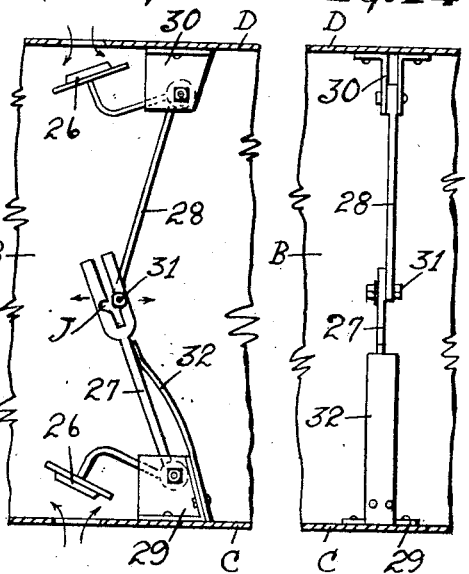
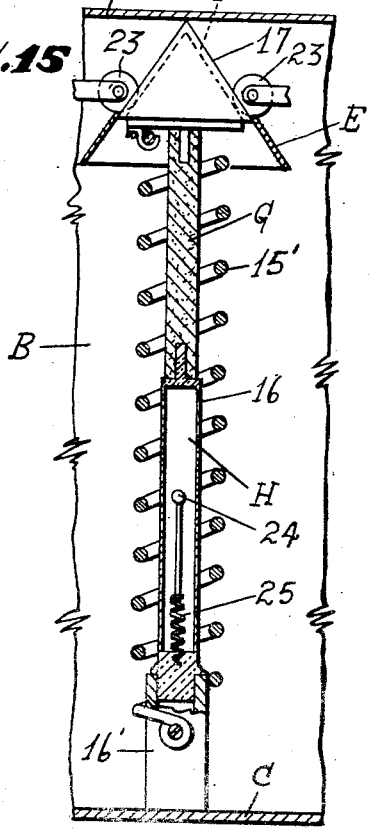
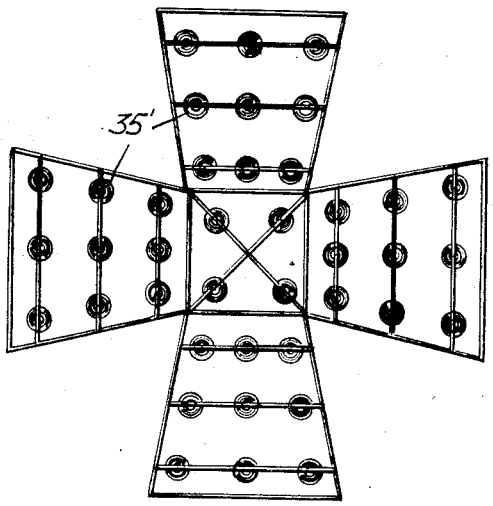
INVENTOR.
ELMORE B. MARPLE Patented Sept. 5, 1944

2,357,417

UNITED STATES PATENT OFFICE 2,357,417

INDICATOR FOR LOCATING MISSING AIRCRAFT

Elmore B. Marple, Wichita, Kans.

Application September 13, 1943, Serial No. 502,101

5 Claims. (Cl. 9—9)

This invention relates to an indicator for the destruction point of aircraft, and has for its principal object an illuminating element releasably carried by the aircraft.

A further object of this invention is to provide a container for a small electric plant, said container being housing in the shell of the fuselage or other parts of an aircraft in such a way that the container is free to be ejected from the aircraft under the influence of impact, or by water as a solvent which in turn will cause illumination of the container.

A still further object of this invention is to provide a gravity actuated means to erect the emergency signal container structure so that its illuminated side will be upwardly positioned for visibility of an approaching aircraft, whether the same be discharged on land or in a body of water, in case of the latter the container will function as a float, the gravity actuating means being batteries for electric energy eccentrically secured by placing the same in the container opposite its light projecting side.

These and other objects will hereinafter be more fully explained, reference being had to the accompanying drawings forming a part of this specification, and in which like characters will apply to like parts in the different views.

Referring to the drawings:

Fig. 1 is a perspective view of an aircraft on which my invention is illustrated.

Fig. 2 is a view illustrating an aircraft submerged, and one of its indicators afloat at the surface of the water.

Fig. 3 represents an aircraft in a crash upon land, the lid for the indicator carried by a wing being opened by the impact and the indicator illuminated to locate the point of crash.

Fig. 4 is an enlarged plan view of the container as installed in the structure of an aircraft, the latter being broken away in part and the lid being removed for convenience of illustration.

Fig. 5 is a vertical sectional view of Fig. 4 to illustrate the compartment and receptacle for the container and opening means for the lid of the compartment.

Fig. 6 is a view through the compartment taken on line 6—6 in Fig. 5.

Fig. 7 is a view through the compartment taken on line 7—7 in Fig. 5 to illustrate the releasable rocking means for the lid of said compartment.

Fig. 8 is a side view of the rockable bracket supporting the lid in an open position, parts removed for convenience of illustration.

Fig. 9 is a sectional view longitudinally through the shell of the container and the lamp reflector.

Fig. 9—A is a modified form for the container.

Fig. 10 is a plan view of the bottom of the container taken on line 10—10 in Fig. 9.

Fig. 11 is an enlarged sectional view through the switch and shell of the container, while Fig. 11—A is a modified form for the switch wherein the neck of the push button is reduced in length to permit flattening of the elastic enclosure for the button, last said switch being in elevation.

Fig. 12 is a side view of the water control valves and levers, taken on line 12—12 in Fig. 4, the valves being in their closed position.

Fig. 13 is a similar view of said valves and levers, the valves being in their open position.

Fig. 14 is a view of the valve controls transverse to that shown in Fig. 13.

Fig. 15 is an enlarged side view of the controlling element for the container lid in its closed position.

Fig. 16 is an unfolded plan view of the spring assembly as shock absorbers for the receptacle installation as shown in Fig. 5.

This invention relates to new and useful improvements not included in my former patent bearing No. 2,317,285, date 1943, said improvements being illustrated in the drawings comprising a compartment A having four side walls B, a bottom C and a top D, said top having an opening therethrough rectangular in form and having a lid 1 to close the opening. Said lid is rockably mounted on a pair of brackets 2 secured thereto and the said brackets each being rockably mounted on a rod 3 that is fixed on the upper ends of posts 4 vertically extending from the bottom of the compartment and being secured thereto and the said brackets, each having a coil spring 5 as tensioning means to open the lid by securing one end of each spring to its respective bracket, the other ends being secured to the said compartment top outward from its rectangular opening. Furthermore there is wound on each end of the rod adjacent its ends other springs 6 secured in such a way as to coact with the first said springs to open the lid promptly when said lid is released from its closed locked position arranged as follows.

Positioned in the compartment opposite the bracket carrying rod and being a spaced distance downward from the under side of the said lid is another rod 7 that is rockably trunnioned in ears 8 that are secured to the lid. Rigidly secured to last said rod adjacent the inner side of each ear is a hook 9, downwardly extending and being tensioned by leaf springs 10 to cause engagement of the hooks with their respective lock bolts 11 as securing means for the said lid in its closed position when forced downward as shown in Figs. 5 and 7. The said hooks may be mainly released by a cantilever 12 rockably mounted on a post 12', said lever having a link 13 connecting one end of the lever to one of the hooks as shown in Fig. 5 and by a downward press on a button 14 that is in registry with an aperture 15 in the lid, said button being secured to the other end of said cantilever, will rock the hooks from engagement with the lock bolts.

There is also provided another means to unlock the lid which in turn will automatically open the lid through the medium of its springs heretofore described, said means comprising a cylindrical stem 16 vertically positioned and seated on a post 16' that is secured to the bottom of compartment A, said stem having a conical head 17 secured to the upper end thereof and having a flange E as a water shed to protect the portion of the stem adjacent thereto should moisture be introduced into the compartment from over head during normal flying of the aircraft.

Wound on the stem is a spring element 15' having its lower end secured to the post 16', the upper end being secured to the conical head for the purpose later described. Oppositely positioned from the stem is a pair of standards 18, the lower ends of which are secured to the said bottom of compartment A, and extending upward to near alignment with the lower extremity of the conical head, said posts each having a brace bar 19 secured thereto and the side wall of said compartment for rigid support for the posts, and the said posts and stem being aligned in working relation to the vertically rocking edge of the lid and hooks carried thereby. Horizontally secured to the upper ends of standards 18 are bars 20, said bars being in longitudinal alignment and each having vertically disposed apertured plates 21 spaced therealong to function as bearings in which the said lock bolts 11 will slidably engage toward and from each other longitudinally, each lock bolt having a spring 22 wound thereon, the ends of which are secured in such a way as to move said bolts inward toward each other to unlock the lid, the outer ends thereof adapted to engage with their respective hooks 9 to lock the lid in its closed position when forced outward by the conical head positioned between the inner ends of the bolts, and the said inner ends each have a roller 23 journalled thereon, said rollers each to engage in their respective grooves F oppositely positioned in the periphery of the conical head, said grooves ranging from the apex to the base of said cone whereby, when the stem is collapsed as later described, the head thereof will move downward by tension of said spring 15' to unlock the lid. The stem above referred to as being cylindrical in form, it will be seen that one portion G thereof is solid and being of a material that will readily dissolve when submerged in water as one means to collapse the steam, the other portion H being hollow and preferably made of glass to break easily under the force of impact whereby the stem will also collapse. Consequentially, in either event, the lock for the lid will be disengaged and the lid free to swing open as heretofore described, to permit releasing of the container from its receptacle and illumination for the purpose described. To assist in breaking the hollow glass portion, it will be seen that a weight 24 is mounted on one end of a wire spring 25, the other end of which is secured to the bottom of the hollow portion, whereby the weight is free to swing in contact with the wall of the glass to break the same at the time of an aircraft crash on land, while the dissolvable portion will become saturated should the said aircraft be submerged in a body of water. In either case the container or float will function to assist in locating its missing aircraft.

As a means to insure water entering the compartment A there is provided a pair of valves 26 adapted to engage in apertures formed in opposite walls of the compartment A, said valves being connected by jointed arms 27 and 28, each of which are rockably mounted in their respective ears 29 and 30. It will be seen that arm 27 at its free end is bifurcated to slidably engage a headed pin 31 secured to the free end of the other arm and the neck of the pin when the valves are opened as shown in Fig. 13 will engage in a bayonet notch J as locking means to retain the valves disengaged from their apertures. To cause engagement of the valves there is provided a leaf spring 32, said spring to yield under pressure of water when the aircraft is submerged; furthermore the bayonet engagement will automatically lock itself under tension of the spring to insure an open position of said valves.

The receptacle above referred to consists of double walls 33 and 34, and bottoms 35, the top being open as a free exit for the container in case of emergency, said walls and bottom being spaced apart by helical springs 35 distributed over said walls and bottoms as a shock absorber as shown in Figs. 5 and 16, whereby the inner walls of the receptacle are cushioned. There is also provided water ways 36 through the walls of the receptacle as shown in Fig. 12 whereby water may enter the same as means to cause the container to float outward when the craft is submerged.

It will be seen that said container comprises a shell 37 having a lens 38 in its upper end as an exit for light rays from a bulb 39 positioned in a reflector 40 that is pendantly carried by a coil spring 41 in axial registry with the lens. Positioned in the other end of the shell is a pair of dry cell batteries 42 seated on a rubber pad 43 and being secured to the bottom of the shell by a double U-shaped clamp 44 having a screw 45 as removable securing means for the batteries, and it will be seen that each U portion will engage over its respective battery whereby the weight of the batteries will erect the container, whether on land or in water. Consequently, the lens will project its rays from the bulb for visual purposes when in search of its respective missing aircraft. The said batteries are connected to the bulb by wires 46, the aircraft being controlled by a switch comprising a push button 47 positioned outward from the shell and being waterproofed by a rubber hood 48 to flex when the button is pressed inward to break the electric circuit, and when released the bulb will be illuminated.

Positioned beneath the lid is a block 49 carried by a spring K, said block having a concavity in its lower side to conform to the lens and top of the shell and adapted to press the switch button inward to break the electric circuit, and when the lid is unlocked and thrown open the circuit will be closed automatically by a spring 50 wound on the stem 51 to cause a contact of plates 52 and 53 to close the circuit.

In Figs. 2 and 5 is shown a cord L wound on a drum M, the free end of said cord being secured to the lower end of the container, and when the aircraft is submerged in water the container will unwind the cord to remain above the water but in close range from said aircraft whereby the aircraft can be readily located.

The said container may be modified in form as shown in Fig. 9—A and in Fig. 11—A is shown a standard switch 54 in elevation wherein the stem 55 is shortened to permit a flat hood to cover the button, and such other modifications may be made as lie within the scope of the appended claims.

Having fully described my invention what I claim as new and desire to secure by Letters Patent is:

1. In an indicator for locating missing aircrafts, a container comprising a hollow shell, a lens positioned in the shell, an electric lighting plant positioned in the shell, said electric lighting plant consisting of dry cell batteries, a bulb and reflector positioned in working relation to the lens and wiring means connecting the batteries to the bulb and a switch secured to the shell and having a push button to make and break an electric current, the button extending outward from the shell and an elastic inclosure for the button, the elastic inclosure being secured water tight to the shell, a receptacle for the container and a compartment for the receptacle, said compartment being found in the structure of an aircraft, and having a lid rockably mounted as an exit for the container, and means on the lid to compress the button to break the electric circuit when the lid is closed, and the circuit being closed when the lid is rocked open for ejection of the container.

2. In an indicator for locating missing aircrafts, compartments formed in the structure of an aircraft adjacent its outer surface, each compartment having a rockable lid to open and close the same, valves for injecting water into the compartments should submersion of the aircraft occur, double wall receptacles with open tops and being positioned in the compartment and springs to space the double walls apart as a shock absorber, said walls each having a water way therethrough and communicating with the compartment, means to lock the lid in a closed position, said means being subject to destruction by submerging in water and by a force of impact to unlock the lids, a hollow container positioned in the receptacle, the container having means therein to produce illumination when removed from the receptacle but retained therein by the lid and removable from the receptacle when the lid is opened.

3. In an indicator for locating missing aircrafts, in combination with an aircraft, a compartment formed in the structure of the aircraft, said compartment having a rockable lid for outside communication, spring means to tension the lid to an open position and a lock to secure the lid in a closed position, and destructible means to control the lock, said destructible means being disabled by water as a solvent therefor to release the lock for the lid to be opened by its springs, a receptacle having sides and one end wall, the other end being open and to be closed by the lid when rocked thereover, a container comprising a shell as an inclosure therefor and being loosely positioned in the receptacle and retained therein by the lid, said container having a lens in the shell at one end thereof, the other end being flat to seat on the bottom of the receptacle, and an electric plant installed in the container and having switch means to control a light bulb, said light bulb being adjacent the lens to illuminate therethrough when the container ejects from the receptacle as the lid is opened and the electric current being broken when the lid is closed in contact with the switch.

4. In an indicator for locating missing aircrafts, as recited in claim 3, the electric plant being electrically energized by dry cell batteries positioned on the flat bottom of the container shell as a gravity actuating means to erect the container with its lens upwardly positioned should the container be submerged to function as a float, or when thrown outward from the lid opening to roll on the earth, said container will erect under gravity by the batteries.

5. In an indicator for locating missing aircrafts, as recited in claim 3, the lock for the lid comprising a pair of bolts axially aligned, longitudinally of the bolts and being spaced apart and adapted to move toward and from each other and means to support the bolts for sliding movement, rollers journalled on the abutting ends of the bolts, the other ends to engage with their respective hooks, said hooks rockably secured to the lid and springs for the bolts to and over the same toward each other simultaneously, the lock controlling means being a cylindrical stem comprising two portions longitudinally arranged, one of said portions being of a material subject to water as a solvent therefor to cause its destruction, the other portion being of tubular glass and breakable under a violent impact when in a crash of the aircraft, the stem having a conical head on one end thereof, the other end being seated on a post, and a coil spring wound on the stem, one end of which is secured to the stem adjacent its conical head, the other end being secured to the post, whereby when either portion of the stem is mutilated the spring will move the conical head downward for retraction of the bolts toward each other to cause their disengagement with the hooks.

ELMORE B. MARPLE.